US006619878B2

United States Patent
Wang et al.

(12) 
(10) Patent No.: US 6,619,878 B2
(45) Date of Patent: Sep. 16, 2003

(54) FASTENING MEANS

(76) Inventors: Shyh-Jen Wang, No. 201, Shih-Pai Road, Sec. 2 (Attn. Experiment Surgery), Taipei (TW); Ming-Ren Lin, No. 3, Lane 86, Wen-Chuan Street, Wu-Lai, Taipei Hsien (TW); Shyh-Yau Wang, No. 33, Kuang-Fu Street, Ying-Ko, Taipei Hsien (TW); Su-Chen Chen, 2F, No. 201-197, Shih-Pai Road, Sec. 2, Taipei (TW)

( * ) Notice: Subject to any disclaimer, the term of this patent is extended or adjusted under 35 U.S.C. 154(b) by 32 days.

(21) Appl. No.: 09/800,235

(22) Filed: Mar. 2, 2001

(65) Prior Publication Data

US 2002/0131818 A1 Sep. 19, 2002

(51) Int. Cl.$^7$ .............................. E05B 9/08; B62D 1/04
(52) U.S. Cl. .................................... 403/374.3
(58) Field of Search ................. 403/290, 342, 403/379.5, 374.3, 324, 378, 358, 365; 279/44, 45, 76, 83, 90, 91, 103; 74/551.1–551.8

(56) References Cited

U.S. PATENT DOCUMENTS

| | | | | | |
|---|---|---|---|---|---|
| 1,138,368 | A | * | 5/1915 | Feeley | 403/355 |
| 4,804,171 | A | * | 2/1989 | Dornfeld | 269/138 |
| 4,862,760 | A | * | 9/1989 | Kuwahara et al. | 403/324 |
| 5,477,747 | A | * | 12/1995 | Cheng | 280/279 |
| 5,580,184 | A | * | 12/1996 | Riccitelli | 280/779 |
| 6,332,619 | B1 | * | 12/2001 | DeRosa | 279/103 |

* cited by examiner

Primary Examiner—Robert E. Pezzuto

(57) ABSTRACT

A fastening device includes a holding base capable of sliding or rotating on a rod or column, a driving bolt rotatably coupled with a thrusting block rotatably engaged in the holding base having a driving wedge face formed on the thrusting block, and a follower block movably reciprocating in the holding base having a follower wedge face formed on the follower block and tangentially engageable with the driving wedge face of the thrusting block; whereby upon a rotation of the driving bolt to inwardly push the thrusting block in the holding base, the follower block will be thrusted by the driving block to interfere in a rod (or column) surface for quickly, ergonomically and firmly fastening the rod (or column) within the holding base.

3 Claims, 4 Drawing Sheets

FASTENING MEANS

BACKGROUND OF THE INVENTION

A conventional fastening device as shown in FIG. 4 includes: a collar C capable of sliding or rotating on a cylindrical rod or column R, and a bolt having a screw portion S engaged with the collar to compress the rod R upon rotation of the knob K formed on an outer end of the bolt.

However, such a conventional fastening device has the following drawbacks:
1. The screw portion S has a single-point compressing on the rod R, easily causing loosening or rotation of the rod unstably held within the collar.
2. The screw tip may stick or injure the rod surface after heavily driving the knob K for firmly fastening the collar on the rod.
3. Great force is required for firmly fastening the collar on the rod, easily causing tiredness to the operator or user.

Another conventional fastening device as shown in FIG. 5 includes a clamp C' for fastening the rod R upon driving of the knob K of a bolt having a screw portion S coupling the clamp. Even the contact surface between the rod and the clamp is increased, it still requires a large force for firmly fastening the rod, causing difficulty for the user.

The present inventor has found the drawbacks of the conventional fastening devices and invented the present fastening means especially for firmly fastening a cylindrical rod or column.

SUMMARY OF THE INVENTION

It is an object of the present invention to provide an apparatus and method for fastening a base on a rod or column securely. It is also an object of the present invention to provide a fastening means capable of securing a base on a rod or column that is greater than that which is provided either by using a conventional bolt-pressing or a conventional bolt-clamping fastening device. Another object of the present invention is to provide a fastening means having wedge-shape contact serving as a toggle-like-mechanism which is capable of being operated with very small force. Also another object of the present invention is to provide a fastening means capable of minimizing operating time of securing a base on a rod or column provided by interference between them.

Still another object of the present invention is to provide a fastening means capable of securing parts by set screws as a whole modulus to prevent working loose.

The present invention is a fastening means including a holding base capable of sliding or rotating on a rod or column, a driving bolt rotatably coupled with a thrusting block with a driving wedge face rotatably engaged in the holding base, and a follower block movably reciprocating in the holding base and having a wedge face tangentially engageable with the driving wedge face of the thrusting block; whereby upon a rotation of the driving bolt to push the thrusting block in the holding base, the follower block will be thrusted by the driving block to interfere in a rod (or column) surface for quickly, ergonomically and firmly fastening the rod (or column) on the holding base.

DETAILED DESCRIPTION

Figure 1:
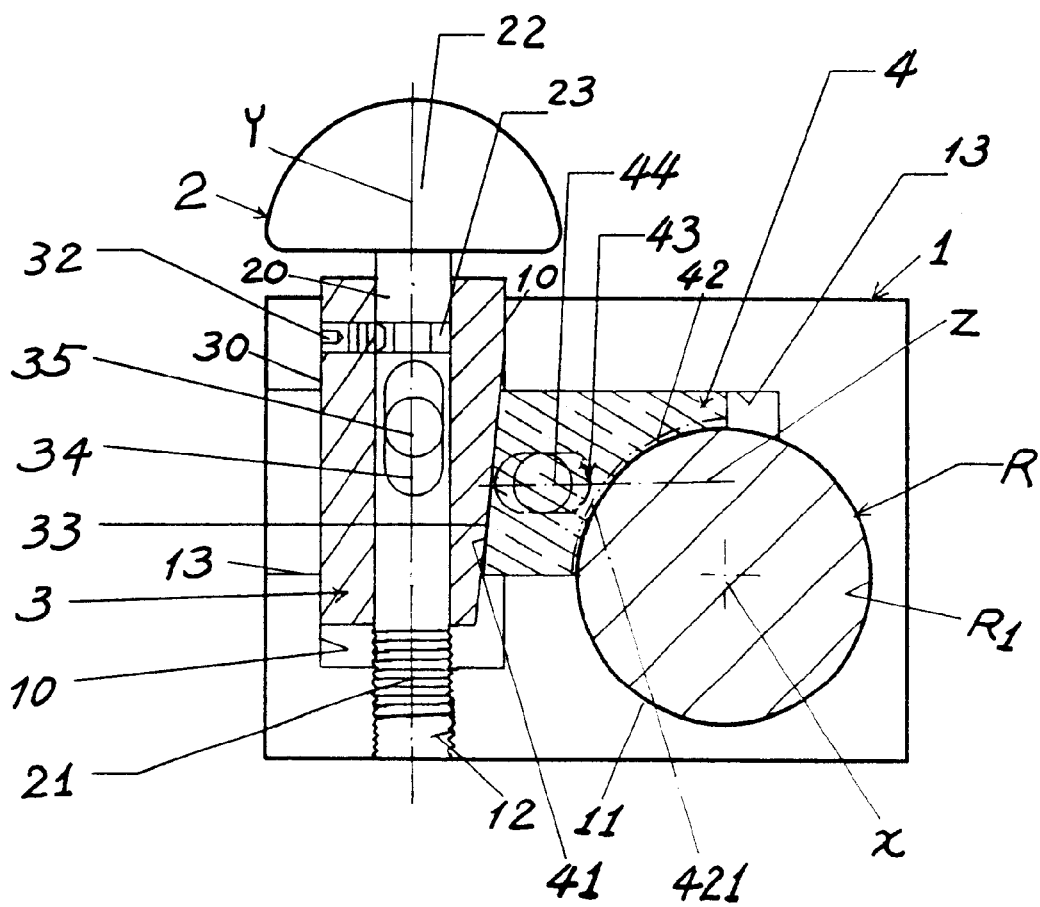
FIG. 1 is a cross sectional drawing of the present invention.
Figure 2:
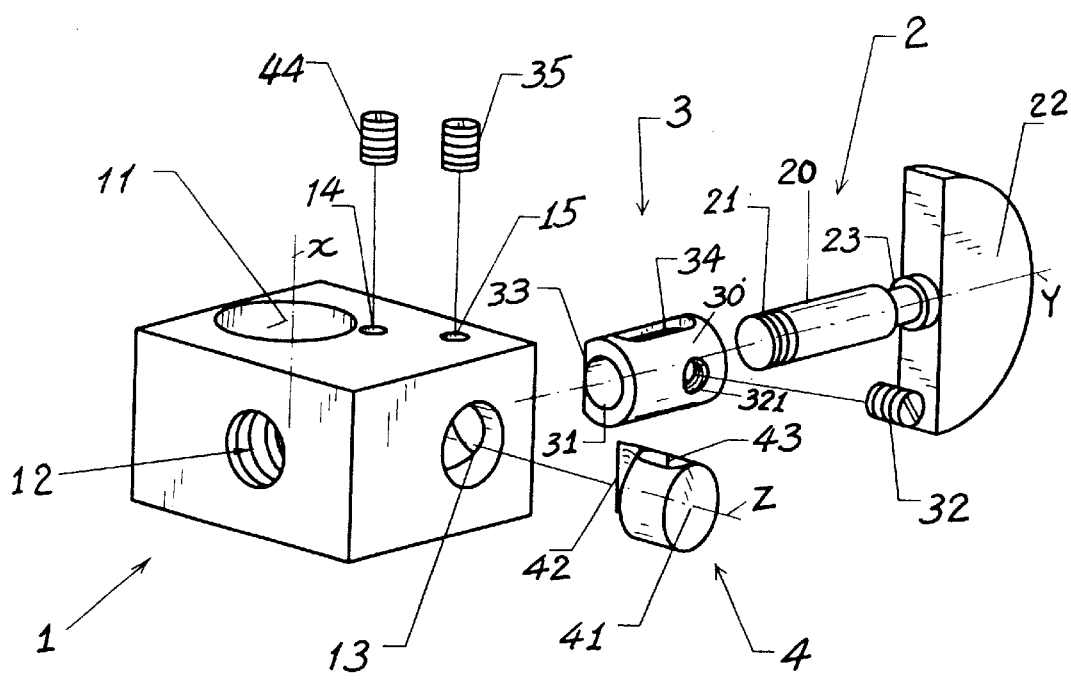
FIG. 2 is an exploded view showing the elements of the present invention.
Figure 3:
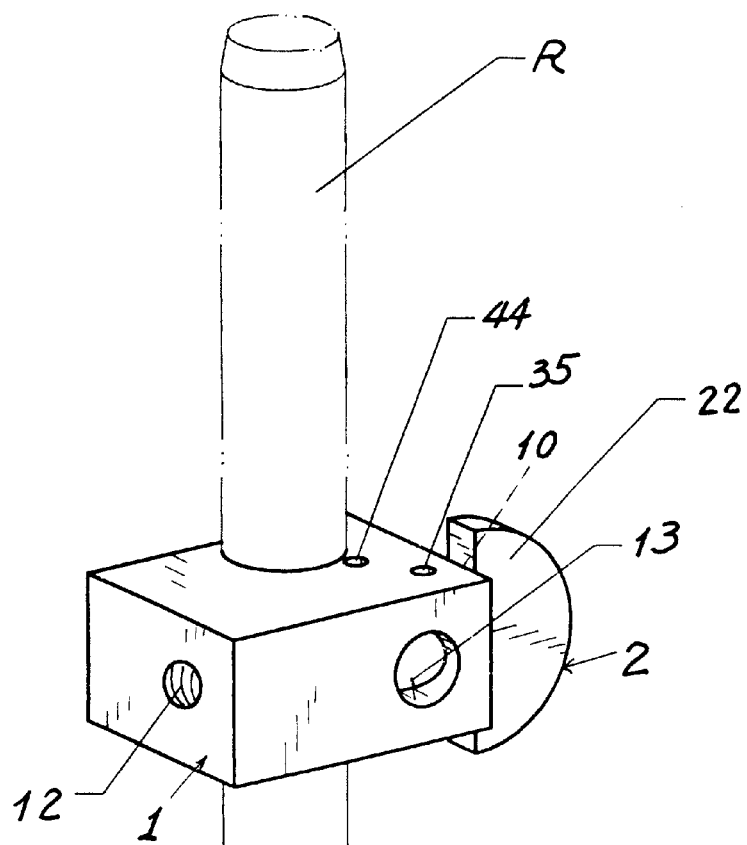
FIG. 3 is a perspective view of the present invention when assembled for fastening a rod.
Figure 4:
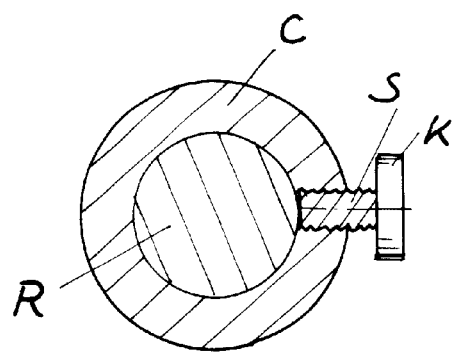
FIG. 4 is a cross sectional drawing of a conventional fastening device for fastening a rod.
Figure 5:
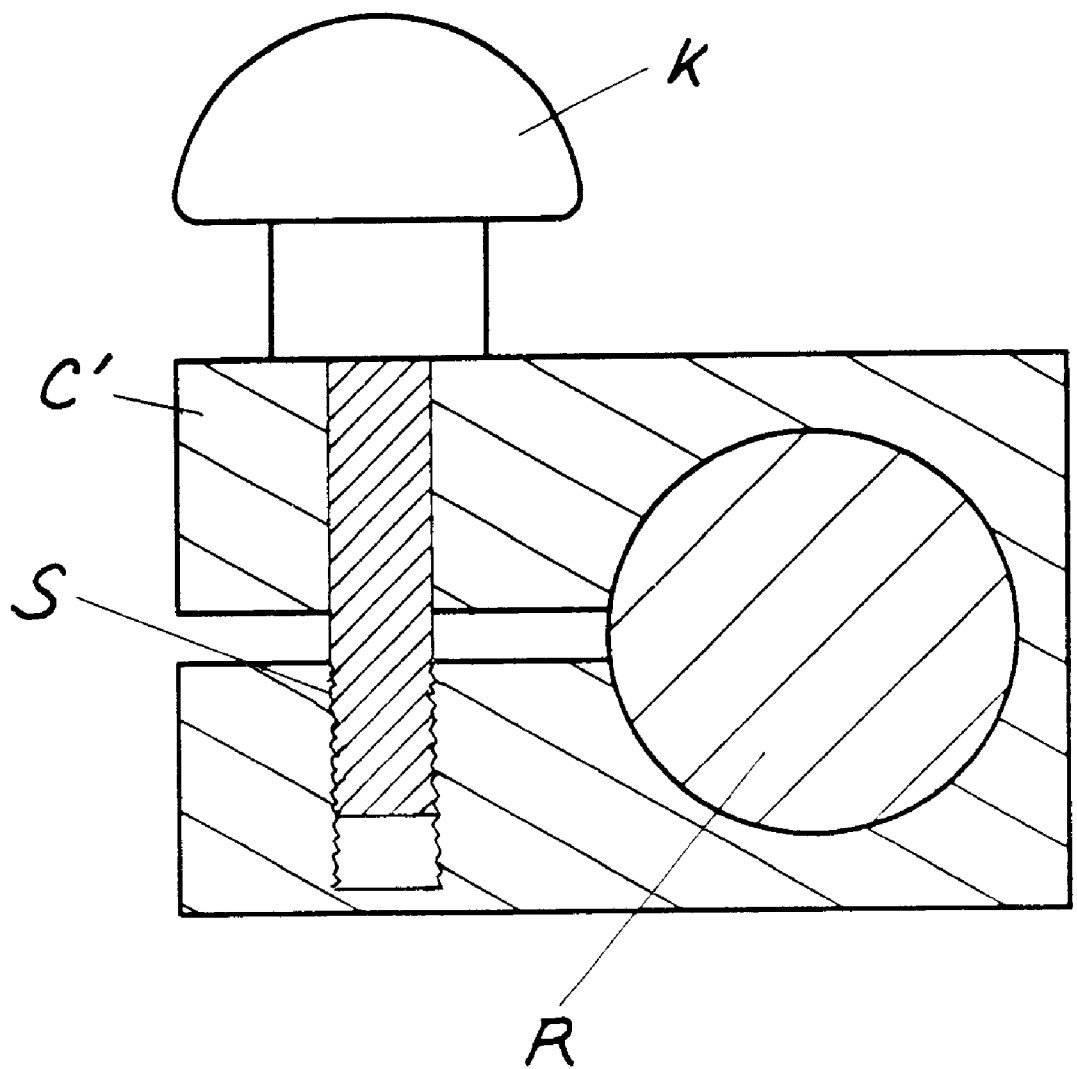
FIG. 5 is a cross sectional drawing of another conventional fastening device for fastening a rod.

As shown in FIGS. 1~3, the fastening means of the present invention comprises: a holding base 1 capable of sliding or rotating on a rod or rod-like fixture R; a driving bolt 2 rotatably engageable with the holding base 1; a thrusting block 3 rotatably coupled with the driving bolt 2 and reciprocatively held in the holding base 1; and a follower block 4 tangentially engageable with the thrusting block 3 and reciprocatively moving in the holding base 1; whereby upon rotating the driving bolt 2, the thrusting block 3 forwarding simultaneously to thrust the follower block 4, then to interfere in the surface of the rod R for firmly fastening the rod R in (or with) the holding base 1.

The rod 1 may be referred to a column, bar, beam, tubular cylinder, or any other rod-like fixture, formed as cylindrical shape or other shapes, not limited in the present invention. However, the cylindrical rod is most preferable to be used in this invention.

The holding base 1 may be integrally formed with or detachably mounted on a fixed object, a fixture, a platform or a building structure (not shown). The rod R may be positioned vertically, horizontally or at any angles to be fastened with the fastening means of the present invention. The fastening means may be made of metals, engineering plastics, composites, or any other suitable materials.

The holding base 1 includes: a rod hole 11 longitudinally formed in or through the holding base capable of sliding or rotating with the rod R about a longitudinal axis X; a first block hole 10 transversely formed in the holding base 1 about a first latitudinal axis Y projectively perpendicular to the longitudinal axis X; a screw hole 12 formed in the holding base 1 and coaxially communicated with the first block hole 10 about the first latitudinal axis Y; and a second block hole 13 transversely formed in the holding base 1 about a second latitudinal axis Z perpendicular to the first latitudinal axis Y to be perpendicularly intersected with the first block hole 10.

The driving bolt 2 includes: a bolt shank portion 20, a screw portion 21 having male threads formed thereon and formed on a distal end of the shank portion 20 to be engageable with the screw hole 12 formed in the holding base 1, a handle (or knob) 22 formed on a proximal end of the shank portion 20, and a neck portion 23 annularly recessed in the shank portion 20 adjacent to the handle portion 22.

The thrusting block 3 includes: a sleeve member 30 capable of sliding in the first block hole 10 formed in the holding base 1, a bolt hole 31 longitudinally formed through the sleeve member 30 and rotatably engageable with the shank portion 20 of the driving bolt 2, a screw 32 rotatably formed in a screw hole 321 transversely formed through the sleeve member 30 and engageable with the neck portion 23 of the driving bolt 2 for rotatably coupling the driving bolt 2 with the thrusting block 3, a driving wedge face 33 formed on a side surface of the sleeve member 30 and tapered inwardly towards the first latitudinal axis Y, a first elongate slot 34 formed in the sleeve member 30 parallel to the first latitudinal axis Y, and a first limiting screw 35 secured in the holding base 1 through a screw hole 15 and slidably engageable with the first elongate slot 34 for preventing an axial rotation of the sleeve member 30 about the first latitudinal axis Y.

The follower block 4 includes: a follower wedge face 41 formed on a first end portion of the follower block 4 to be tangentially engageable with the driving wedge face 33 of the thrusting block 3, a recess portion 42 recessed in a second end portion of the follower block 4 opposite to the follower wedge face 41 in order to interfere in (or to interferentially hold) the rod R, a second elongate slot 43 formed in the follower block 4 parallel to the second latitudinal axis Z, and a second limiting screw 44 secured in the holding base 1 through a screw hole 14 and slidably engageable with the second elongate slot 43 for preventing an axial rotation of the follower block 4 about the second latitudinal axis Z.

The recess portion 42 may be formed as an arcuate shape in order to be well engaged with a cylindrical surface of the rod R if formed as a cylindrical shape.

A packing layer 421, which is made of rubber or elastomer materials, may be formed on the recess portion 42 to increase its frictional contact with the rod surface R1 of the rod for firmly fastening the rod R within the rod hole 11 in the holding base. The rod hole 11 as shown in the drawing figures is formed as a cylindrical hole.

When fastening the rod R with the fastening means of the present invention by passing the rod R in the rod hole 11 of the holding base 1, the driving bolt 2 is rotated (for example in a clockwise direction) about the axis Y to protrude inwardly in the block hole 10 and screw hole 12 to simultaneously move the thrusting block 3 inwardly, whereby the follower wedge face 41 of the follower block 4 will be thrusted by the driving wedge face 33 of the thrusting block 3 to push the follower block 4 towards the rod R, then the recess portion 42 of the follower block 4 is interfered in the rod surface R1 of the rod R, thereby firmly fastening the rod R within the holding base 1. For loosening or separating the rod from the base 1, the driving bolt 2 is rotated in a reverse direction to retract the block 4 from the rod.

The present invention is superior to the conventional fastening device with the following advantages:

1. By means of the thrusting and follower wedge faces 33, 41 (serving as "toggle-like mechanism") of the thrusting block 3 and follower block 4, the force required to fasten the rod R can be much smaller for ergonomically driving the bolt 2 of the present invention.
2. A contact surface of the arcuate recess portion 42 of the block 4 has been increased (not a single-point contact) to interfere in the rod surface R1, thereby stably firmly fastening the rod R.
3. The assembly of the present invention secured by set screws as a whole modulus, the parts of the invention will not work loose.
4. The arcuate recess portion provides a gentle contact with the rod surface R1, especially when packed by a packing layer 421 between the block 4 and the rod R, thereby preventing scratch injury or damage to the rod surface R1.

The present invention may be modified without departing from the spirit and scope of the present invention. For instance, the holding base 1 may be integrally formed or mounted on a platform, a fixture or a building wall (or roof) in order to adjustably fasten the rod (or beam, or column) in the base 1. The driving bolt 2 may be manually operated or operated by the aid of a tool such as a screw driver or a wrench.

We claim:

1. A fastening means comprising:
    a holding base capable of sliding or rotating on a rod, said holding base including: a rod hole longitudinally formed in the holding base to be slidably engageable with the rod about a longitudinal axis (X); a first block hole transversely formed in the holding base about a first latitudinal axis (Y) projectively perpendicular to the longitudinal axis (X); a screw hole formed in the holding base and coaxially communicated with the first block hole about the first latitudinal axis (Y); and a second block hole transversely formed in the holding base about a second latitudinal axis (Z) perpendicular to the first latitudinal axis (Y) to be perpendicularly intersected with the first block hole;
    a driving bolt rotatably engageable in the holding base, said driving bolt including: a bolt shank portion, a screw portion having male threads formed thereon and formed on a distal end of the shank portion to be engageable with the screw hole formed in the holding base, a handle formed on a proximal end of the shank portion, and a neck portion annularly recessed in the shank portion adjacent to the handle portion;
    a thrusting block rotatably coupled with the driving bolt and reciprocatively held in the holding base, said thrusting block including: a sleeve member slidably engageable with the first block hole formed in the holding base, a bolt hole longitudinally formed through the sleeve member and rotatably engageable with the shank portion of the driving bolt, a screw rotatably formed in a screw hole transversely formed through the sleeve member and engageable with the neck portion of the driving bolt for rotatably coupling the driving bolt with the thrusting block, a driving slope surface formed on a side surface of the sleeve member and tapered inwardly towards the first latitudinal axis (Y), a first elongate slot formed in the sleeve member parallel to the first latitudinal axis (Y), and a first limiting screw secured in the holding base and slidably engageable with the first elongate slot for preventing an axial rotation of the sleeve member about the first latitudinal axis (Y); and
    a follower block engageable with the thrusting block and reciprocatively moving in the holding base, and said follower block engaging in said second block hole in said holding base and including: a follower wedge face formed on a first end portion of the follower block to be tangentially engageable with the driving wedge face of the thrusting block, a recess portion recessed in a second end portion of the follower block opposite to the follower wedge face in order to interfere in a rod surface circumferentially formed on the rod, a second elongate slot formed in the follower block parallel to the second latitudinal axis (Z), and a second limiting screw secured in the holding base and slidably engageable with the second elongate slot for preventing an axial rotation of the follower block about the second latitudinal axis (Z); whereby upon rotation of the driving bolt for driving the thrusting block inwardly in said base, said follower block will be thrusted to interfere in the rod for firmly fastening the rod in the holding base.

2. A fastening means according to claim 1, wherein said recess portion of said follower block is formed as an arcuate shape in order to be well engaged with a cylindrical rod surface of the rod.

3. A fastening means according to claim 2, wherein said recess portion further includes a packing layer formed on the recess portion to increase a frictional contact with the rod surface of the rod for firmly fastening the rod.

* * * * *